US012666065B2

(12) United States Patent
Zhao et al.

(10) Patent No.: US 12,666,065 B2
(45) Date of Patent: Jun. 23, 2026

(54) SIGNALING FOR ZERO RESIDUAL FLAG AND PREDICTION MODE

(71) Applicant: Tencent America LLC, Palo Alto, CA (US)

(72) Inventors: Xin Zhao, San Jose, CA (US); Liang Zhao, Sunnyvale, CA (US); Madhu Peringassery Krishnan, Mountain View, CA (US); Jing Ye, San Jose, CA (US); Han Gao, San Diego, CA (US); Shan Liu, San Jose, CA (US)

(73) Assignee: Tencent America LLC, Palo Alto, CA (US)

( * ) Notice: Subject to any disclaimer, the term of this patent is extended or adjusted under 35 U.S.C. 154(b) by 140 days.

(21) Appl. No.: 18/632,916

(22) Filed: Apr. 11, 2024

(65) Prior Publication Data

US 2024/0406426 A1     Dec. 5, 2024

Related U.S. Application Data

(60) Provisional application No. 63/470,759, filed on Jun. 2, 2023.

(51) Int. Cl.
*H04N 19/00*        (2014.01)
*H04N 19/176*       (2014.01)
*H04N 19/44*        (2014.01)

(52) U.S. Cl.
CPC ........... *H04N 19/44* (2014.11); *H04N 19/176* (2014.11)

(58) Field of Classification Search
None
See application file for complete search history.

(56) References Cited

U.S. PATENT DOCUMENTS

2023/0199177 A1 *  6/2023  Zhang .................... H04N 19/18
                                                          375/240.02

FOREIGN PATENT DOCUMENTS

WO    WO 2020/243881 A1    12/2020
WO    WO 2022/037700 A1    2/2022

OTHER PUBLICATIONS

International Search Report and Written Opinion, Aug. 8, 2024, pp 1-12, issued in International Application No. PCT/US24/26240, ISA/US, Commissioner for Patents, Alexandria, Virginia.

* cited by examiner

*Primary Examiner* — Zhihan Zhou
(74) *Attorney, Agent, or Firm* — Crowell & Moring LLP

(57)        ABSTRACT

This disclosure relates generally to video coding/decoding. One method performed by a decoder includes receiving a video bitstream comprising a current picture, the current picture comprising a current block, and the current block comprising a current transform block; determining a skip transform flag indicating whether the current transform block has all zero coefficient or not via one of: receiving the skip transform flag from the video bitstream; or deriving the skip transform flag; deriving, based on the skip transform flag, at least one of following flags: an flag indicating whether Intra Block Copy is applied to the current block; an interPrediction flag indicating whether the current block is coded in inter-prediction mode; and reconstructing the current block based on at least one of: the IntraBC flag, the interPrediction flag.

20 Claims, 11 Drawing Sheets

PARTITION_NONE      PARTITION_VERT      PARTITION_HORZ      PARTITION_SPLIT

SPLIT_BT_VER     SPLIT_BT_HOR     SPLIT_TT_VER     SPLIT_TT_HOR

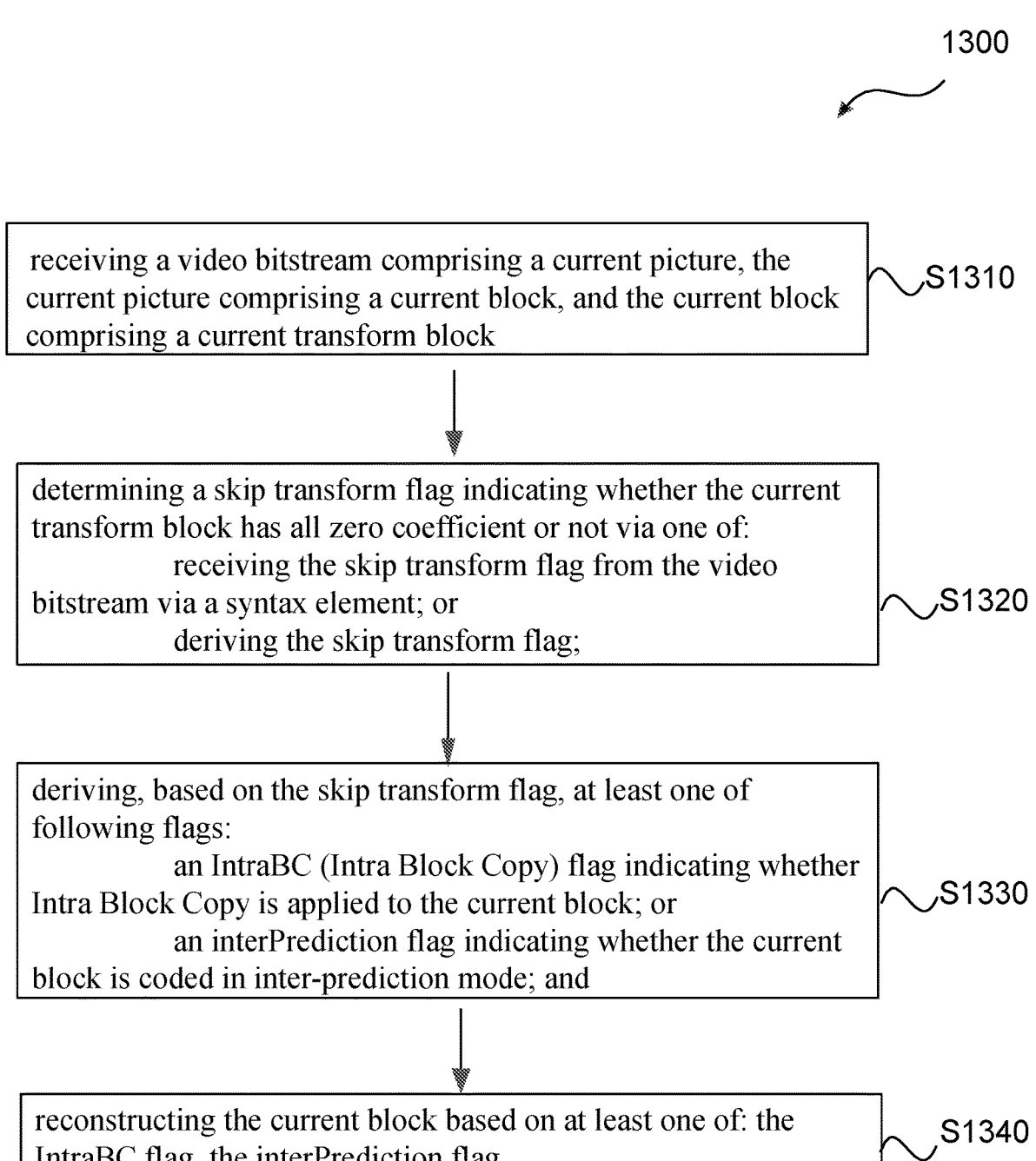

1300 receiving a video bitstream comprising a current picture, the current picture comprising a current block, and the current block comprising a current transform block
S1310 determining a skip transform flag indicating whether the current transform block has all zero coefficient or not via one of:
        receiving the skip transform flag from the video bitstream via a syntax element; or
        deriving the skip transform flag;
S1320 deriving, based on the skip transform flag, at least one of following flags:
        an IntraBC (Intra Block Copy) flag indicating whether Intra Block Copy is applied to the current block; or
        an interPrediction flag indicating whether the current block is coded in inter-prediction mode; and
S1330 reconstructing the current block based on at least one of: the IntraBC flag, the interPrediction flag
S1340

*FIG. 13*

SIGNALING FOR ZERO RESIDUAL FLAG AND PREDICTION MODE

INCORPORATION BY REFERENCE

This application is based on and claims the benefit of priority to U.S. Provisional Application No. 63/470,759, filed on Jun. 2, 2023, which is herein incorporated by reference in its entirety.

TECHNICAL FIELD

This disclosure describes a set of advanced video/streaming coding/decoding technologies. More specifically, the disclosed technology involves enhancement on signaling and entropy coding for zero residual flag, or zero transform coefficient flag.

BACKGROUND

Uncompressed digital video can include a series of pictures, and may specific bitrate requirements for storage, data processing, and for transmission bandwidth in streaming applications. One purpose of video coding and decoding can be the reduction of signaling overhead in video bit stream, through various compression and encoding techniques.

SUMMARY

The present disclosure describes various embodiments of methods, apparatus, and computer-readable storage medium for enhancing signaling and entropy coding of zero residual flag, or zero transform coefficient flag.

According to one aspect, an embodiment of the present disclosure provides a method for decoding a video bitstream, performed by a decoder, the method include receiving a video bitstream comprising a current picture, the current picture comprising a current block, and the current block comprising a current transform block; determining a skip transform flag indicating whether the current transform block has all zero coefficient or not via one of: receiving the skip transform flag from the video bitstream; or deriving the skip transform flag; deriving, based on the skip transform flag, at least one of following flags: an IntraBC (Intra Block Copy) flag indicating whether Intra Block Copy is applied to the current block; an interPrediction flag indicating whether the current block is coded in inter-prediction mode; reconstructing the current block based on at least one of: the IntraBC flag, the interPrediction flag.

According to another aspect, an embodiment of the present disclosure provides an apparatus or decoder for decoding a video bitstream. The apparatus/decoder includes a memory storing instructions; and a processor in communication with the memory. When the processor executes the instructions, the processor is configured to cause the apparatus/decoder to perform the above methods for video decoding and/or encoding.

In another aspect, an embodiment of the present disclosure provides non-transitory computer-readable mediums storing instructions which when executed by a computer for video decoding and/or encoding cause the computer to perform the above methods for video decoding and/or encoding.

The above and other aspects and their implementations are described in greater detail in the drawings, the descriptions, and the claims.

BRIEF DESCRIPTION OF THE DRAWINGS

Further features, the nature, and various advantages of the disclosed subject matter will be more apparent from the following detailed description and the accompanying drawings in which:

FIG. 13 shows an example logic flow for a method in the present disclosure.

DETAILED DESCRIPTION OF EMBODIMENTS

The invention will now be described in detail hereinafter with reference to the accompanied drawings, which form a part of the present invention, and which show, by way of illustration, specific examples of embodiments. Please note that the invention may, however, be embodied in a variety of different forms and, therefore, the covered or claimed subject matter is intended to be construed as not being limited to any of the embodiments to be set forth below. Please also note that the invention may be embodied as methods, devices, components, or systems. Accordingly, embodiments of the invention may, for example, take the form of hardware, software, firmware or any combination thereof.

Throughout the specification and claims, terms may have nuanced meanings suggested or implied in context beyond an explicitly stated meaning. The phrase "in one embodiment" or "in some embodiments" as used herein does not necessarily refer to the same embodiment and the phrase "in another embodiment" or "in other embodiments" as used herein does not necessarily refer to a different embodiment. Likewise, the phrase "in one implementation" or "in some implementations" as used herein does not necessarily refer to the same implementation and the phrase "in another implementation" or "in other implementations" as used herein does not necessarily refer to a different implementation. It is intended, for example, that claimed subject matter includes combinations of exemplary embodiments/implementations in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may be used to describe any feature, structure, or characteristic in a singular sense or may be used to describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

Figure 1:
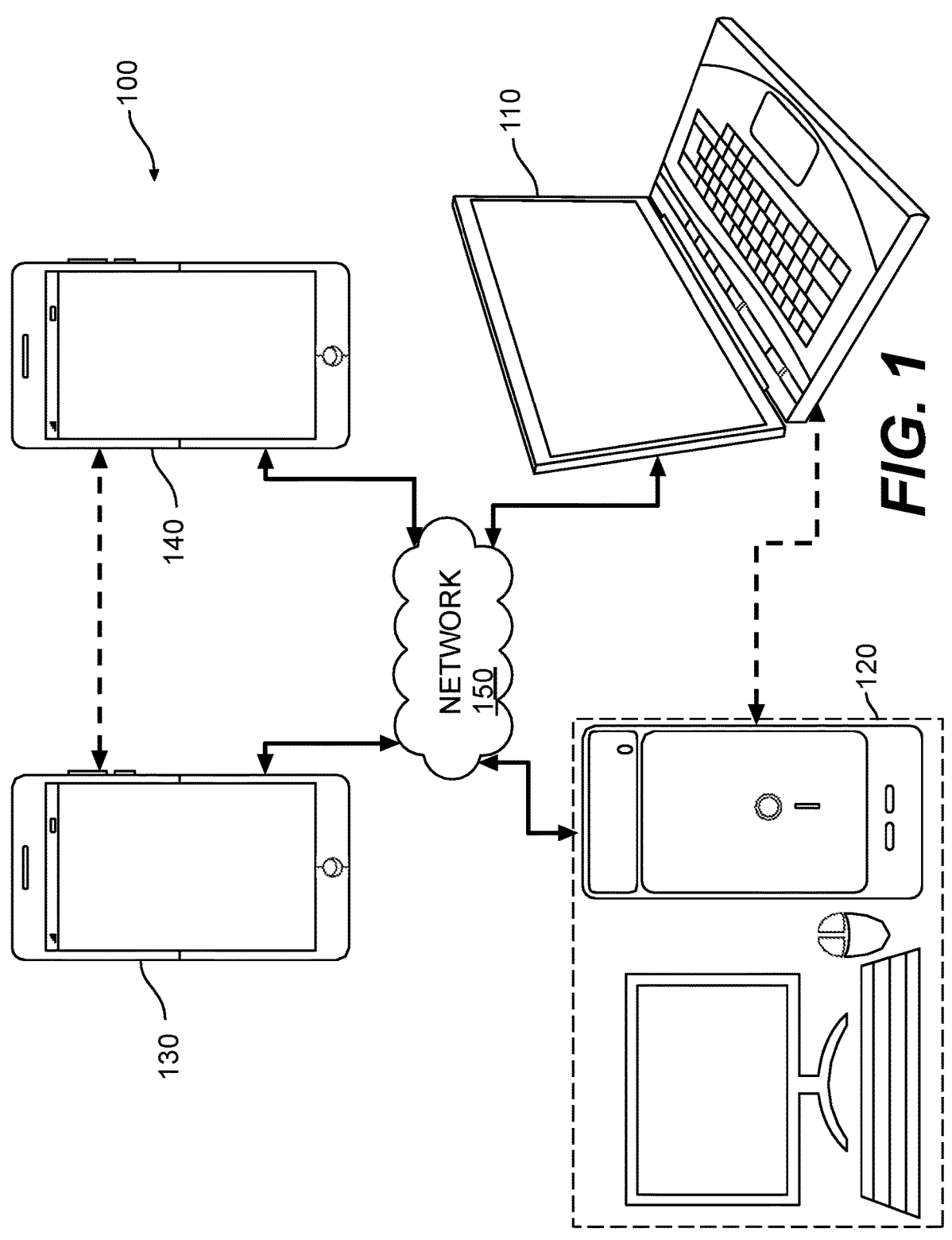
FIG. 1 shows a schematic illustration of a simplified block diagram of a communication system (100) in accordance with an example embodiment.

As shown in FIG. 1, terminal devices may be implemented as servers, personal computers and smart phones but the applicability of the underlying principles of the present disclosure may not be so limited. Embodiments of the present disclosure may be implemented in desktop computers, laptop computers, tablet computers, media players, wearable computers, dedicated video conferencing equipment, and/or the like. The network (150) represents any number or types of networks that convey coded video data among the terminal devices, including for example wireline (wired) and/or wireless communication networks. The communication network (150) may exchange data in circuit-switched, packet-switched, and/or other types of channels. Representative networks include telecommunications networks, local area networks, wide area networks and/or the Internet.

Figure 2:
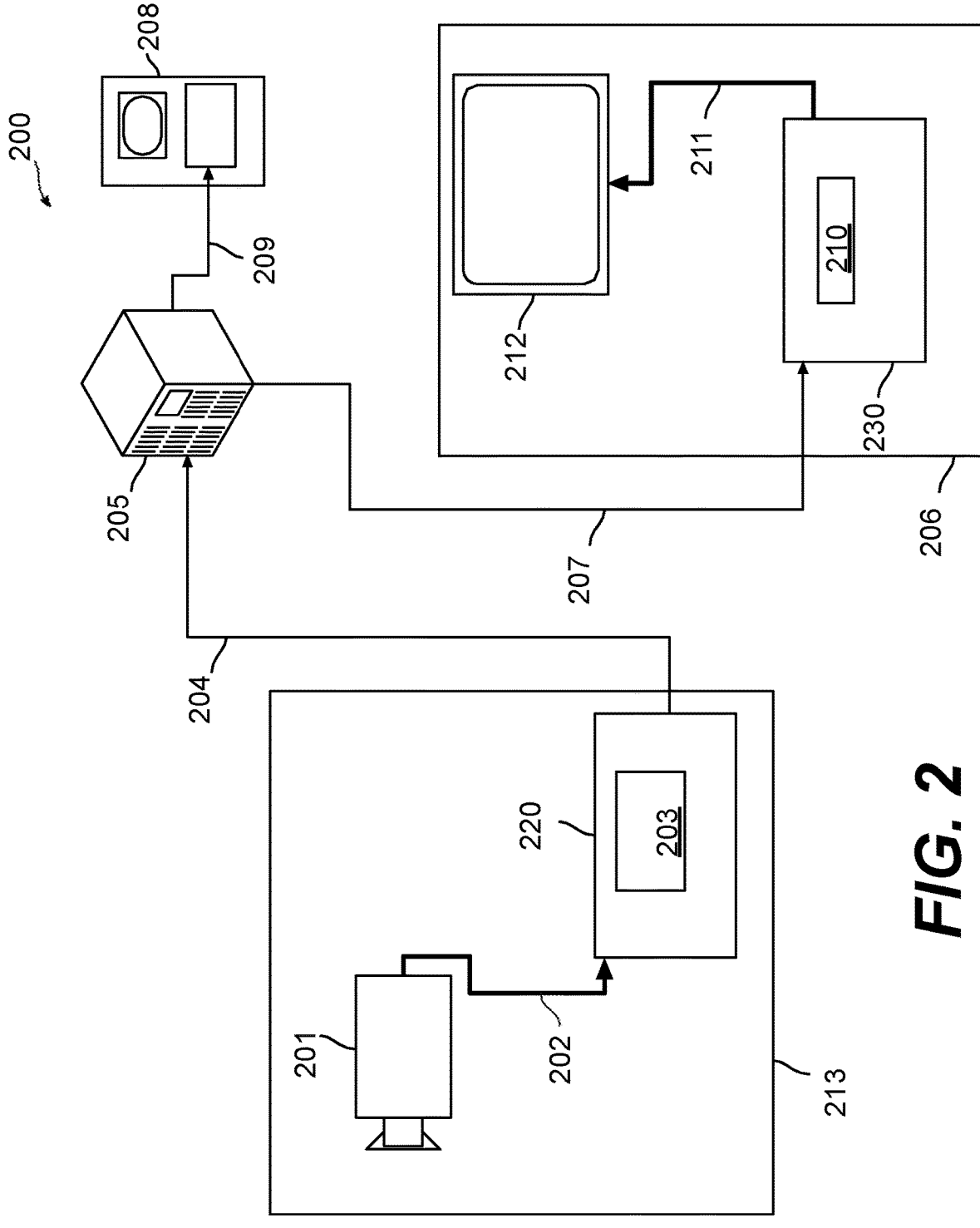
FIG. 2 shows a schematic illustration of a simplified block diagram of a communication system (200) in accordance with an example embodiment.

FIG. 2 illustrates, as an example for an application for the disclosed subject matter, a placement of a video encoder and a video decoder in a video streaming environment. The disclosed subject matter may be equally applicable to other video applications, including, for example, video conferencing, digital TV broadcasting, gaming, virtual reality, storage of compressed video on digital media including CD, DVD, memory stick and the like, and so on.

As shown in FIG. 2, a video streaming system may include a video capture subsystem (213) that can include a video source (201), e.g., a digital camera, for creating a stream of video pictures or images (202) that are uncompressed. In an example, the stream of video pictures (202) includes samples that are recorded by a digital camera of the video source (201). The stream of video pictures (202), depicted as a bold line to emphasize a high data volume when compared to encoded video data (204) (or coded video bitstreams), can be processed by an electronic device (220) that includes a video encoder (203) coupled to the video source (201). The video encoder (203) can include hardware, software, or a combination thereof to enable or implement aspects of the disclosed subject matter as described in more detail below. The encoded video data (204) (or encoded video bitstream (204)), depicted as a thin line to emphasize a lower data volume when compared to the stream of uncompressed video pictures (202), can be stored on a streaming server (205) for future use or directly to downstream video devices (not shown). One or more streaming client subsystems, such as client subsystems (206) and (208) in FIG. 2 can access the streaming server (205) to retrieve copies (207) and (209) of the encoded video data (204). A client subsystem (206) can include a video decoder (210), for example, in an electronic device (230). The video decoder (210) decodes the incoming copy (207) of the encoded video data and creates an outgoing stream of video pictures (211) that are uncompressed and that can be rendered on a display (212) (e.g., a display screen) or other rendering devices (not depicted).

Figure 3:
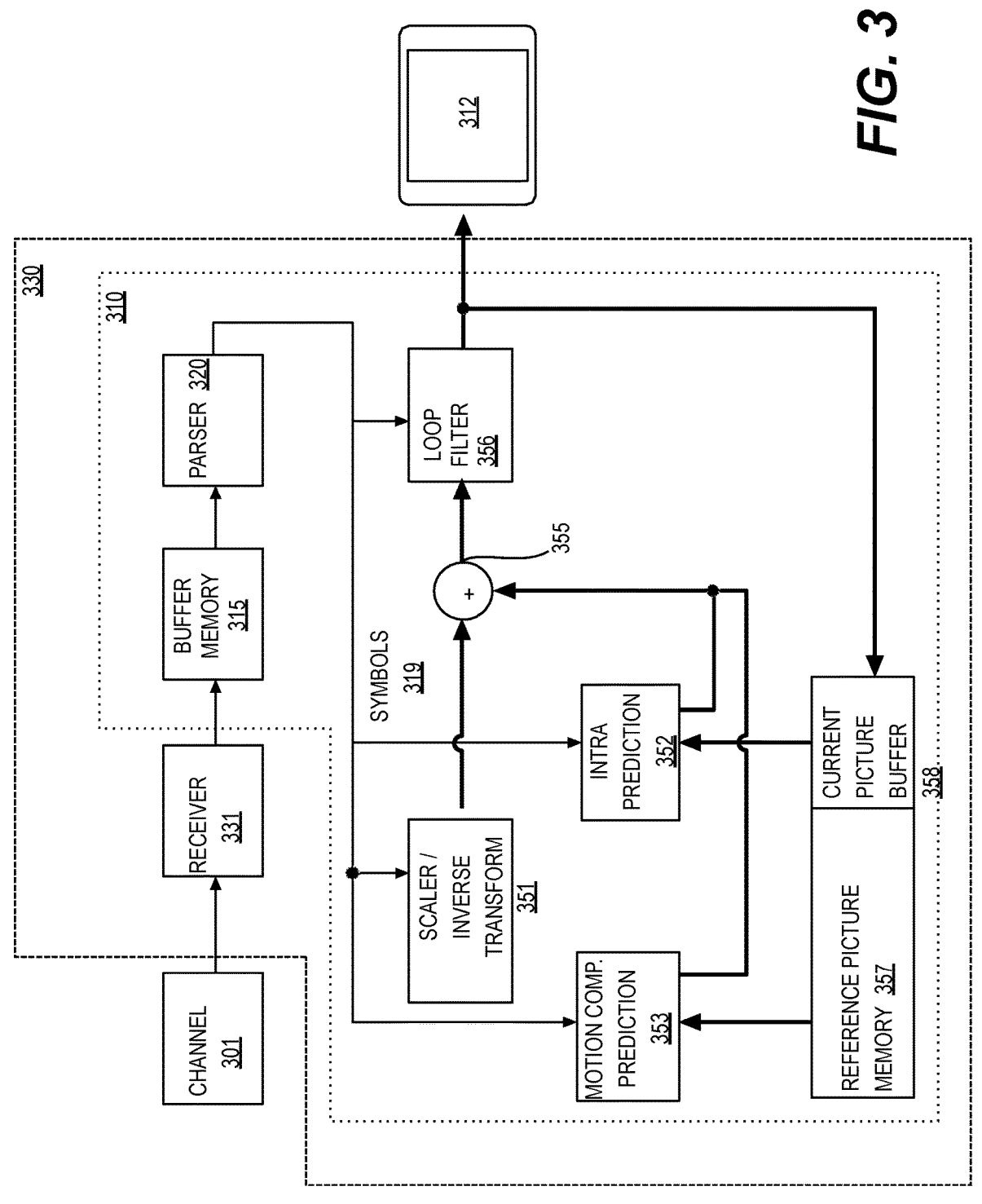
FIG. 3 shows a schematic illustration of a simplified block diagram of a video decoder in accordance with an example embodiment.

FIG. 3 shows a block diagram of a video decoder (310) of an electronic device (330) according to any embodiment of the present disclosure below. The electronic device (330) can include a receiver (331) (e.g., receiving circuitry). The video decoder (310) can be used in place of the video decoder (210) in the example of FIG. 2.

As shown, in FIG. 3, the receiver (331) may receive one or more coded video sequences from a channel (301). To combat network jitter and/or handle playback timing, a buffer memory (315) may be disposed in between the receiver (331) and an entropy decoder/parser (320) ("parser (320)" henceforth). The parser (320) may reconstruct symbols (321) from the coded video sequence. Categories of those symbols include information used to manage operation of the video decoder (310), and potentially information to control a rendering device such as display (312) (e.g., a display screen). The parser (320) may parse/entropy-decode the coded video sequence. The parser (320) may extract from the coded video sequence, a set of subgroup parameters for at least one of the subgroups of pixels in the video decoder. The subgroups can include Groups of Pictures (GOPs), pictures, tiles, slices, macroblocks, Coding Units (CUs), blocks, Transform Units (TUs), Prediction Units (PUs) and so forth. The parser (320) may also extract from the coded video sequence information such as transform coefficients (e.g., Fourier transform coefficients), quantizer parameter values, motion vectors, and so forth. Reconstruction of the symbols (321) can involve multiple different processing or functional units. The units that are involved and how they are involved may be controlled by the subgroup control information that was parsed from the coded video sequence by the parser (320).

A first unit may include the scaler/inverse transform unit (351). The scaler/inverse transform unit (351) may receive a quantized transform coefficient as well as control information, including information indicating which type of inverse transform to use, block size, quantization factor/parameters, quantization scaling matrices, and the lie as symbol(s) (321) from the parser (320). The scaler/inverse transform unit (351) can output blocks comprising sample values that can be input into aggregator (355).

In some cases, the output samples of the scaler/inverse transform (351) can pertain to an intra coded block, i.e., a block that does not use predictive information from previously reconstructed pictures, but can use predictive information from previously reconstructed parts of the current picture. Such predictive information can be provided by an intra picture prediction unit (352). In some cases, the intra picture prediction unit (352) may generate a block of the same size and shape of the block under reconstruction using surrounding block information that is already reconstructed and stored in the current picture buffer (358). The current picture buffer (358) buffers, for example, partly reconstructed current picture and/or fully reconstructed current picture. The aggregator (355), in some implementations, may add, on a per sample basis, the prediction information the intra prediction unit (352) has generated to the output sample information as provided by the scaler/inverse transform unit (351).

In other cases, the output samples of the scaler/inverse transform unit (351) can pertain to an inter coded, and potentially motion compensated block. In such a case, a motion compensation prediction unit (353) can access reference picture memory (357) based on motion vector to fetch samples used for inter-picture prediction. After motion compensating the fetched reference samples in accordance with the symbols (321) pertaining to the block, these samples can be added by the aggregator (355) to the output of the scaler/inverse transform unit (351) (output of unit 351 may be referred to as the residual samples or residual signal) so as to generate output sample information.

The output samples of the aggregator (355) can be subject to various loop filtering techniques in the loop filter unit (356) including several types of loop filters. The output of the loop filter unit (356) can be a sample stream that can be output to the rendering device (312) as well as stored in the reference picture memory (357) for use in future inter-picture prediction.

Figure 4:
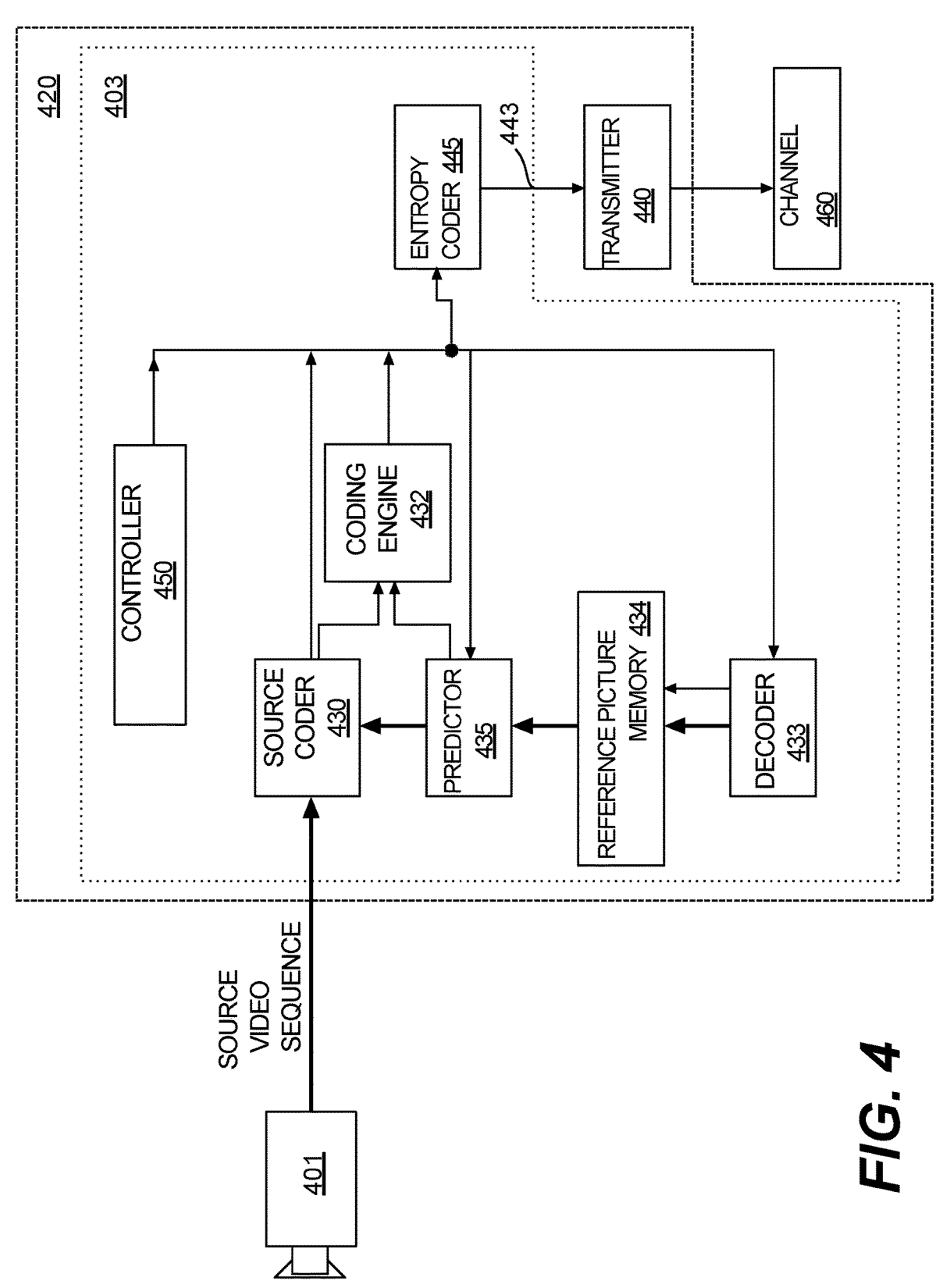
FIG. 4 shows a schematic illustration of a simplified block diagram of a video encoder in accordance with an example embodiment.

FIG. 4 shows a block diagram of a video encoder (403) according to an example embodiment of the present disclosure. The video encoder (403) may be included in an electronic device (420). The electronic device (420) may further include a transmitter (440) (e.g., transmitting circuitry). The video encoder (403) can be used in place of the video encoder (403) in the example of FIG. 4.

The video encoder (403) may receive video samples from a video source (401). According to some example embodiments, the video encoder (403) may code and compress the pictures of the source video sequence into a coded video sequence (443) in real time or under any other time constraints as required by the application. Enforcing appropriate coding speed constitutes one function of a controller (450). In some embodiments, the controller (450) may be functionally coupled to and control other functional units as described below. Parameters set by the controller (450) can include rate control related parameters (picture skip, quantizer, lambda value of rate-distortion optimization techniques, . . . ), picture size, group of pictures (GOP) layout, maximum motion vector search range, and the like.

In some example embodiments, the video encoder (403) may be configured to operate in a coding loop. The coding loop can include a source coder (430), and a (local) decoder (433) embedded in the video encoder (403). The decoder (433) reconstructs the symbols to create the sample data in a similar manner as a (remote) decoder would create even though the embedded decoder 433 process coded video steam by the source coder 430 without entropy coding (as any compression between symbols and coded video bitstream in entropy coding may be lossless in the video compression technologies considered in the disclosed subject matter). An observation that can be made at this point is that any decoder technology except the parsing/entropy decoding that may only be present in a decoder also may necessarily need to be present, in substantially identical functional form, in a corresponding encoder. For this reason, the disclosed subject matter may at times focus on decoder operation, which allies to the decoding portion of the encoder. The description of encoder technologies can thus be abbreviated as they are the inverse of the comprehensively described decoder technologies. Only in certain areas or aspects a more detail description of the encoder is provided below.

During operation in some example implementations, the source coder (430) may perform motion compensated predictive coding, which codes an input picture predictively with reference to one or more previously coded picture from the video sequence that were designated as "reference pictures."

The local video decoder (433) may decode coded video data of pictures that may be designated as reference pictures. The local video decoder (433) replicates decoding processes that may be performed by the video decoder on reference pictures and may cause reconstructed reference pictures to be stored in a reference picture cache (434). In this manner, the video encoder (403) may store copies of reconstructed reference pictures locally that have common content as the reconstructed reference pictures that will be obtained by a far-end (remote) video decoder (absent transmission errors).

The predictor (435) may perform prediction searches for the coding engine (432). That is, for a new picture to be coded, the predictor (435) may search the reference picture memory (434) for sample data (as candidate reference pixel blocks) or certain metadata such as reference picture motion vectors, block shapes, and so on, that may serve as an appropriate prediction reference for the new pictures.

The controller (450) may manage coding operations of the source coder (430), including, for example, setting of parameters and subgroup parameters used for encoding the video data.

Output of all aforementioned functional units may be subjected to entropy coding in the entropy coder (445). The transmitter (440) may buffer the coded video sequence(s) as created by the entropy coder (445) to prepare for transmission via a communication channel (460), which may be a hardware/software link to a storage device which would store the encoded video data. The transmitter (440) may merge coded video data from the video coder (403) with other data to be transmitted, for example, coded audio data and/or ancillary data streams (sources not shown).

The controller (450) may manage operation of the video encoder (403). During coding, the controller (450) may assign to each coded picture a certain coded picture type, which may affect the coding techniques that may be applied to the respective picture. For example, pictures often may be assigned as one of the following picture types: an Intra Picture (I picture), a predictive picture (P picture), a bi-directionally predictive picture (B Picture), a multiple-predictive picture. Source pictures commonly may be subdivided spatially into a plurality of sample coding blocks as described in further detail below.

Figure 5:
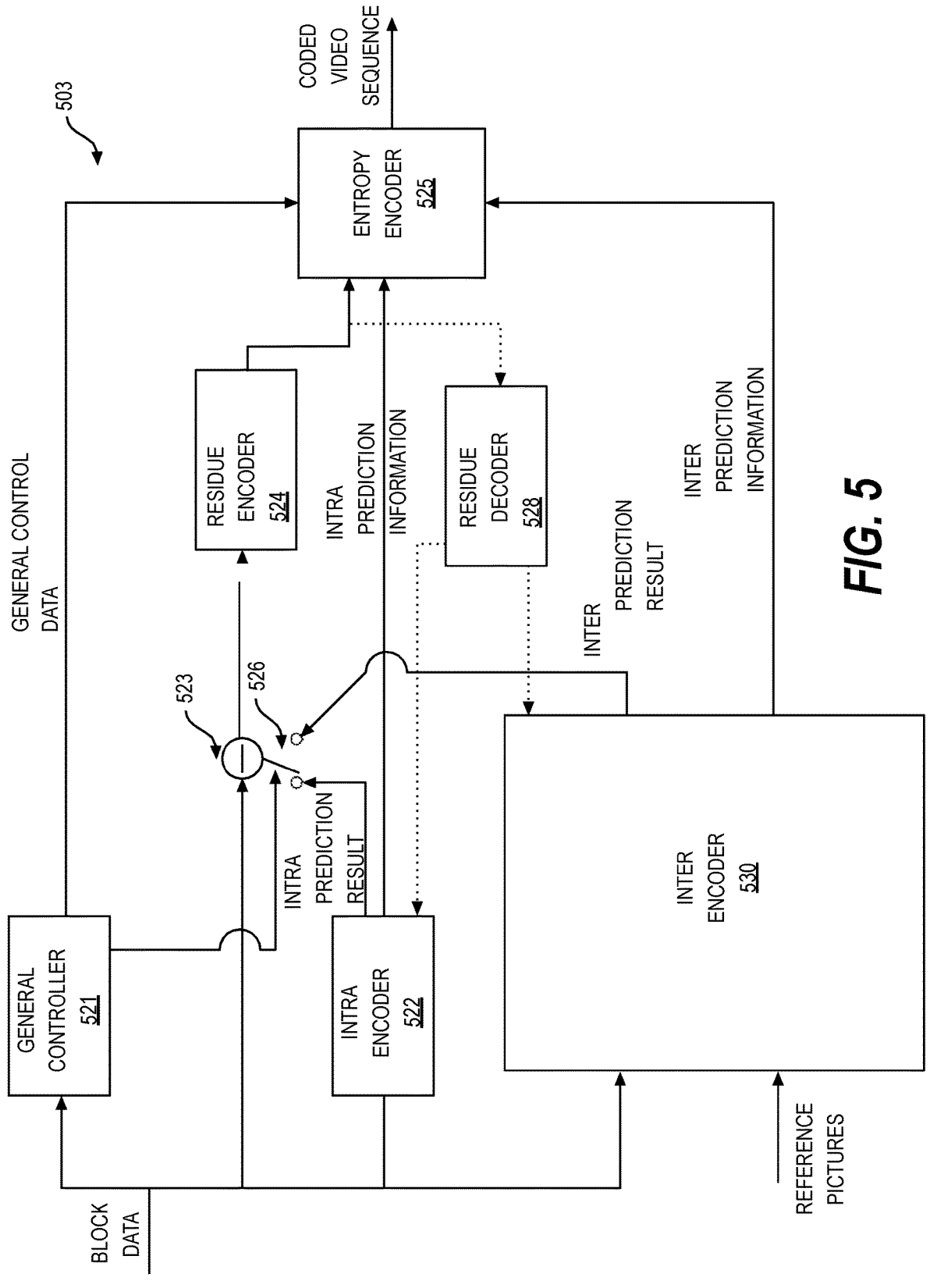
FIG. 5 shows a block diagram of a video encoder in accordance with another example embodiment.

FIG. 5 shows a diagram of a video encoder (503) according to another example embodiment of the disclosure. The video encoder (503) is configured to receive a processing block (e.g., a prediction block) of sample values within a current video picture in a sequence of video pictures, and encode the processing block into a coded picture that is part of a coded video sequence. The example video encoder (503) may be used in place of the video encoder (403) in the FIG. 4 example.

For example, the video encoder (503) receives a matrix of sample values for a processing block. The video encoder (503) then determines whether the processing block is best coded using intra mode, inter mode, or bi-prediction mode using, for example, rate-distortion optimization (RDO).

In the example of FIG. 5, the video encoder (503) includes an inter encoder (530), an intra encoder (522), a residue calculator (523), a switch (526), a residue encoder (524), a general controller (521), and an entropy encoder (525) coupled together as shown in the example arrangement in FIG. 5.

The inter encoder (530) is configured to receive the samples of the current block (e.g., a processing block), compare the block to one or more reference blocks in reference pictures (e.g., blocks in previous pictures and later pictures in display order), generate inter prediction information (e.g., description of redundant information according to inter encoding technique, motion vectors, merge mode information), and calculate inter prediction results (e.g., predicted block) based on the inter prediction information using any suitable technique.

The intra encoder (522) is configured to receive the samples of the current block (e.g., a processing block), compare the block to blocks already coded in the same picture, and generate quantized coefficients after transform, and in some cases also to generate intra prediction information (e.g., an intra prediction direction information according to one or more intra encoding techniques).

The general controller (521) may be configured to determine general control data and control other components of the video encoder (503) based on the general control data to, for example, determine the prediction mode of the block and provides a control signal to the switch (526) based on the prediction mode.

The residue calculator (523) may be configured to calculate a difference (residue data) between the received block and prediction results for the block selected from the intra encoder (522) or the inter encoder (530). The residue encoder (524) may be configured to encode the residue data to generate transform coefficients. The transform coefficients are then subject to quantization processing to obtain quantized transform coefficients. In various example embodiments, the video encoder (503) also includes a residual decoder (528). The residual decoder (528) is configured to perform inverse-transform, and generate the decoded residue data. The entropy encoder (525) may be configured to format the bitstream to include the encoded block and perform entropy coding.

Figure 6:
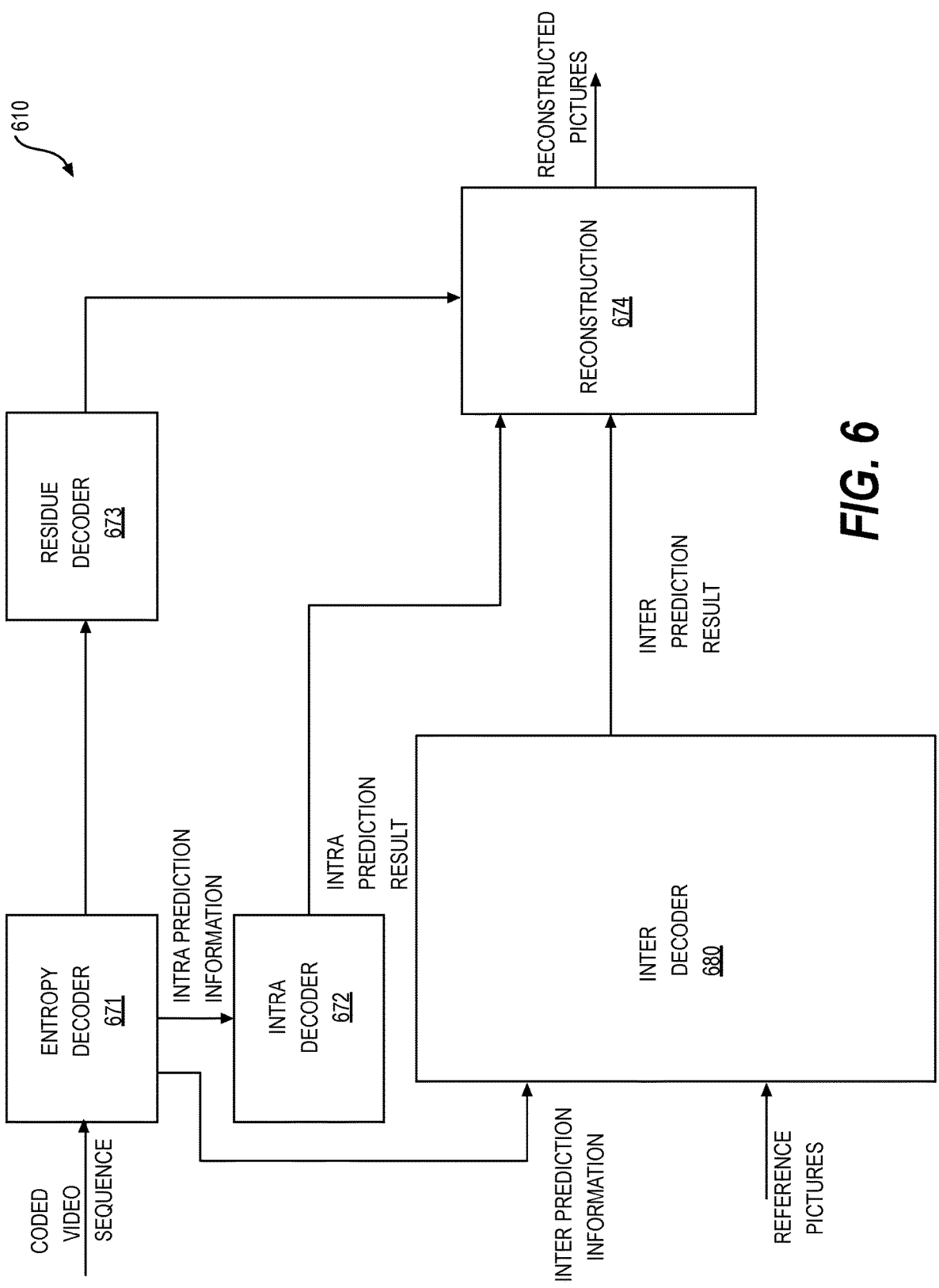
FIG. 6 shows a block diagram of a video decoder in accordance with another example embodiment.

FIG. 6 shows a diagram of an example video decoder (610) according to another embodiment of the disclosure. The video decoder (610) is configured to receive coded pictures that are part of a coded video sequence, and decode the coded pictures to generate reconstructed pictures. In an example, the video decoder (610) may be used in place of the video decoder (410) in the example of FIG. 4.

In the example of FIG. 6, the video decoder (610) includes an entropy decoder (671), an inter decoder (680), a residual decoder (673), a reconstruction module (674), and an intra decoder (672) coupled together as shown in the example arrangement of FIG. 6.

The entropy decoder (671) can be configured to reconstruct, from the coded picture, certain symbols that represent the syntax elements of which the coded picture is made up. The inter decoder (680) may be configured to receive the inter prediction information, and generate inter prediction results based on the inter prediction information. The intra decoder (672) may be configured to receive the intra prediction information, and generate prediction results based on the intra prediction information. The residual decoder (673) may be configured to perform inverse quantization to extract de-quantized transform coefficients, and process the de-quantized transform coefficients to convert the residual from the frequency domain to the spatial domain. The reconstruction module (674) may be configured to combine, in the spatial domain, the residual as output by the residual decoder (673) and the prediction results (as output by the inter or intra prediction modules as the case may be) to form a reconstructed block forming part of the reconstructed picture as part of the reconstructed video.

It is noted that the video encoders (203), (403), and (503), and the video decoders (210), (310), and (610) can be implemented using any suitable technique. In some example embodiments, the video encoders (203), (403), and (503), and the video decoders (210), (310), and (610) can be implemented using one or more integrated circuits. In another embodiment, the video encoders (203), (403), and (503), and the video decoders (210), (310), and (610) can be implemented using one or more processors that execute software instructions.

Turning to block partitioning for coding and decoding, general partitioning may start from a base block and may follow a predefined ruleset, particular patterns, partition trees, or any partition structure or scheme. The partitioning may be hierarchical and recursive. After dividing or partitioning a base block following any of the example partitioning procedures or other procedures described below, or the combination thereof, a final set of partitions or coding blocks may be obtained. Each of these partitions may be at one of various partitioning levels in the partitioning hierarchy, and may be of various shapes. Each of the partitions may be referred to as a coding block (CB). For the various example partitioning implementations described further below, each resulting CB may be of any of the allowed sizes and partitioning levels. Such partitions are referred to as coding blocks because they may form units for which some basic coding/decoding decisions may be made and coding/decoding parameters may be optimized, determined, and signaled in an encoded video bitstream. The highest or deepest level in the final partitions represents the depth of the coding block partitioning structure of tree. A coding block may be a luma coding block or a chroma coding block. The CB tree structure of each color may be referred to as coding block tree (CBT). The coding blocks of all color channels may collectively be referred to as a coding unit (CU). The hierarchical structure of for all color channels may be collectively referred to as coding tree unit (CTU). The partitioning patterns or structures for the various color channels in in a CTU may or may not be the same.

In some implementations, partition tree schemes or structures used for the luma and chroma channels may not need to be the same. In other words, luma and chroma channels may have separate coding tree structures or patterns. Further, whether the luma and chroma channels use the same or different coding partition tree structures and the actual coding partition tree structures to be used may depend on whether the slice being coded is a P, B, or I slice. For example, For an I slice, the chroma channels and luma channel may have separate coding partition tree structures or coding partition tree structure modes, whereas for a P or B slice, the luma and chroma channels may share a same coding partition tree scheme. When separate coding partition tree structures or modes are applied, a luma channel may be partitioned into CBs by one coding partition tree structure, and a chroma channel may be partitioned into chroma CBs by another coding partition tree structure.

Figure 7:
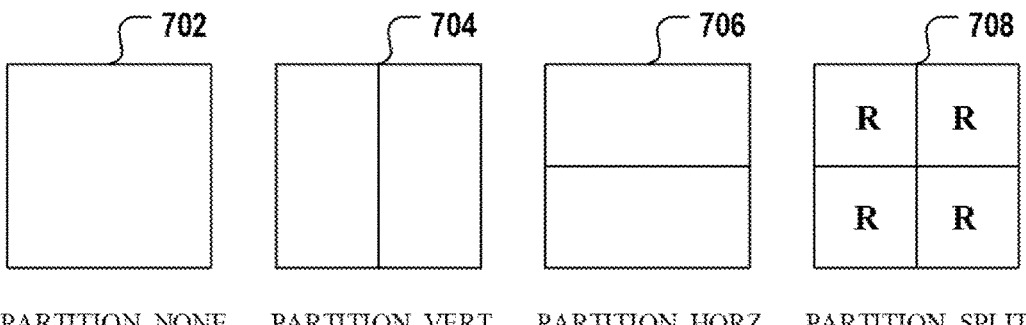
FIG. 7 shows a scheme of coding block partitioning according to example embodiments of the disclosure.

In some example implementations, a predetermined partitioning pattern may be applied to a base block. As shown in FIG. 7, an example 4-way partition tree may start from a first predefined level (e.g., 64×64 block level or other sizes, as a base block size) and a base block may be partitioned hierarchically down to a predefined lowest level (e.g., 4×4 level). For example, a base block may be subject to four predefined partitioning options or patterns indicated by 702, 704, 706, and 708, with the partitions designated as R being allowed for recursive partitioning in that the same partition options as indicated in FIG. 7 may be repeated at a lower scale until the lowest level (e.g., 4×4 level). In some implementations, additional restrictions may be applied to the partitioning scheme of FIG. 7. In the implementation of FIG. 7, rectangular partitions (e.g., 1:2/2:1 rectangular partitions) may be allowed but they may not be allowed to be recursive, whereas square partitions are allowed to be recursive. The partitioning following FIG. 7 with recursion, if needed, generates a final set of coding blocks. A coding tree depth may be further defined to indicate the splitting depth from the root node or root block. For example, the coding tree depth for the root node or root block, e.g. a 64×64 block, may be set to 0, and after the root block is further split once following FIG. 7, the coding tree depth is increased by 1. The maximum or deepest level from 64×64 base block to a minimum partition of 4×4 would be 4 (starting from level 0) for the scheme above. Such partitioning scheme may apply to one or more of the color channels. Each color channel may be partitioned independently following the scheme of FIG. 7 (e.g., partitioning pattern or option among the predefined patterns may be independently determined for each of the color channels at each hierarchical level). Alternatively, two or more of the color channels may share the same hierarchical pattern tree of FIG. 7 (e.g., the same partitioning pattern or option among the predefined patterns may be chosen for the two or more color channels at each hierarchical level).

FIG. 7 illustrates an extended partition tree which provides up to 4 partition types for any given transform type. In this scheme, every prediction block is assigned a transform partition type based on the RD advantage. The transform size assigned to the prediction block is determined based on the transform partition type and the prediction block size in the following way:

PARTITION_NONE: Assigns a transform size that is equal to the block size.

PARTITION_SPLIT: Assigns a transform size that is ½ the width of the block size and ½ the height of the block size.

PARTITION_HORZ: Assigns a transform size with the same width as the block size and ½ the height of the block size.

PARTITION_VERT: Assigns a transform size with ½ the width of the block size and the same height as the block size.

In some example implementations, the partition types in FIG. 7 all contain uniform transform sizes, and recursion is not used in partition type 708 (i.e., recursion level=0).

Figure 8:
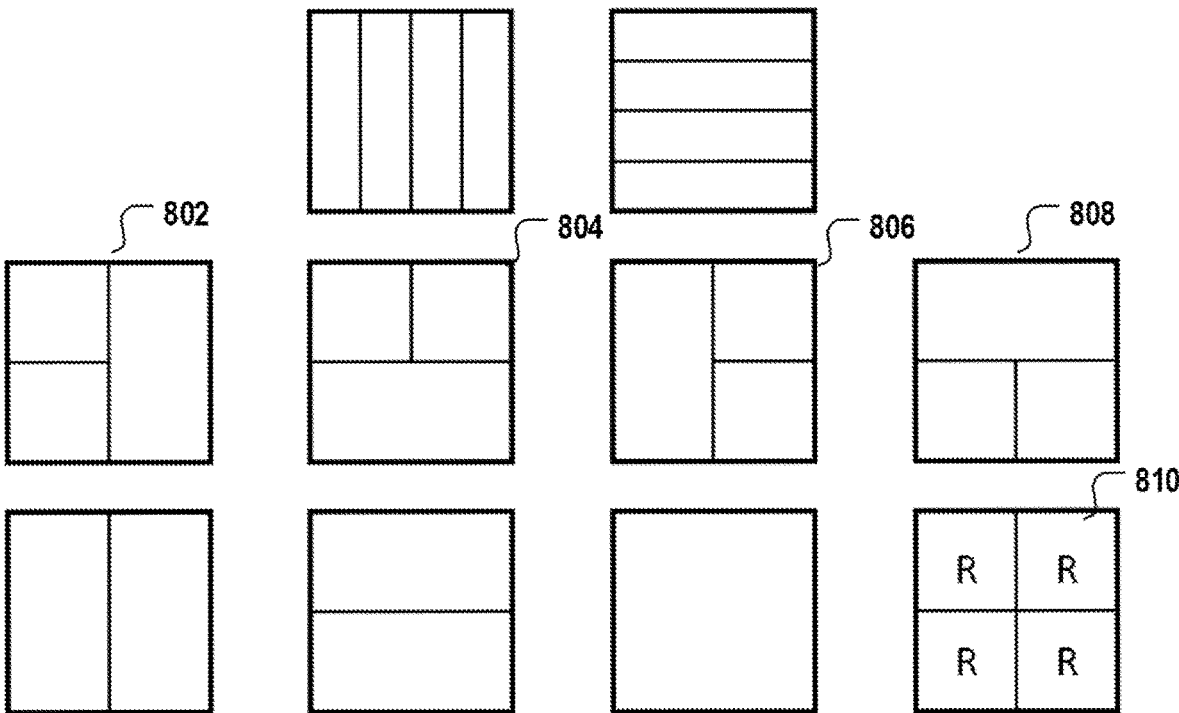
FIG. 8 shows another scheme of coding block partitioning according to example embodiments of the disclosure.

FIG. 8 shows an example predefined 10-way partitioning structure/pattern allowing recursive partitioning to form a partitioning tree. The root block may start at a predefined level (e.g. from a base block at 128×128 or 64×64 level). The example partitioning structure of FIG. 8 includes various 2:1/1:2 and 4:1/1:4 rectangular partitions. In some example implementations, none of the rectangular partitions of FIG. 8 is allowed to be further subdivided. A coding tree depth may be further defined to indicate the splitting depth from the root node or root block. For example, the coding tree depth for the root node or root block may be set to 0, and after the root block is further split once following FIG. 8, the coding tree depth is increased by 1. In some implementations, only the all-square partitions in 810 (denoted by "R")

may be allowed for recursive partitioning into the next level of the partitioning tree following pattern of FIG. 8.

As shown in FIG. 8, the Partition types with 3 sub-partitions in the second row is called "T-type" partition. The "T-Type" partition is named as Left T-Type 802, Top T-Type 804, Right T-Type 806 and Bottom T-Type 808, from left to right in second middle row of FIG. 8.

In some example implementations, a coding tree unit (CTU) may be split into coding units (CUs) by using a quadtree structure denoted as coding tree to adapt to various local characteristics. The decision on whether to code a picture area using inter-picture (temporal) or intra-picture (spatial) prediction is made at the CU level. Each CU can be further split into one, two or four prediction units (PUs) according to the PU splitting type. Inside one PU, the same prediction process is applied and the relevant information is transmitted to the decoder on a PU basis. After obtaining the residual block by applying the prediction process based on the PU splitting type, a CU can be partitioned into transform units (TUs) according to another quadtree structure like the coding tree for the CU. In some example implementations, a CU or a TU can only be square shape, while a PU may be square or rectangular shape for an inter predicted block. In some example implementations, one coding block may be further split into four square sub-blocks, and transform is performed on each sub-block, i.e., TU. Each TU can be further split recursively (using quadtree split) into smaller TUs, which is called Residual Quad-Tree (RQT).

In some example implementations, at picture boundary, implicit quad-tree split may be employed so that a block will keep quad-tree splitting until the size fits the picture boundary.

Such quadtree splitting may be applied hierarchically and recursively to any square shaped partitions. Whether a base block or an intermediate block or partition is further quadtree split may be adapted to various local characteristics of the base block or intermediate block/partition.

Figure 9:
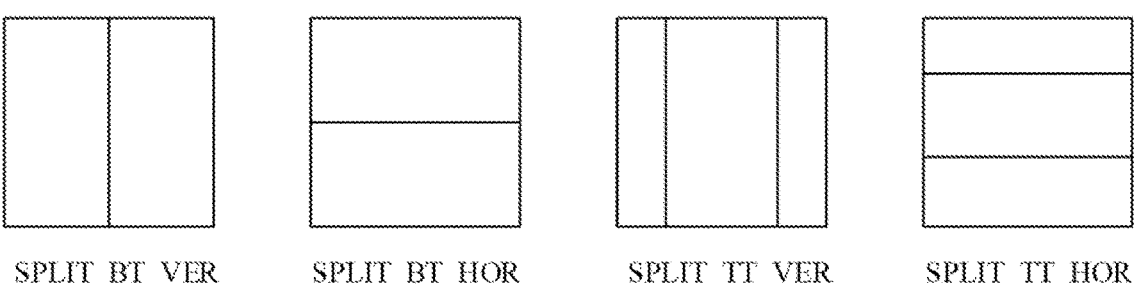
FIG. 9 shows another scheme of coding block partitioning according to example embodiments of the disclosure.

Another example implementation for partitioning of a base block into CBs, PBs and or TBs is further described below. For example, rather than using a multiple partition unit types such as those shown in FIG. 7 or FIG. 8, a quadtree with nested multi-type tree using binary and/or ternary splits segmentation structure may be used. The separation of the CB, PB and TB (i.e., the partitioning of CB into PBs and/or TBs, and the partitioning of PBs into TBs) may be abandoned except when needed for CBs that have a size too large for the maximum transform length, where such CBs may need further splitting. This example partitioning scheme may be designed to support more flexibility for CB partition shapes so that the prediction and transform can both be performed on the CB level without further partitioning. In such a coding tree structure, a CB may have either a square or rectangular shape. Specifically, a coding tree block (CTB) may be first partitioned by a quadtree structure. Then the quadtree leaf nodes may be further partitioned by a nested multi-type tree structure. An example of the nested multi-type tree structure using binary or ternary splitting is shown in FIG. 9. Specifically, the example multi-type tree structure of FIG. 9 includes four splitting types, referred to as vertical binary splitting (SPLIT_BT_VER), horizontal binary splitting (SPLIT_BT_HOR), vertical ternary splitting (SPLIT_TT_VER), and horizontal ternary splitting (SPLIT_TT_HOR). The CBs then correspond to leaves of the multi-type tree. In this example implementation, unless the CB is too large for the maximum transform length, this segmentation is used for both prediction and transform processing without any further partitioning. This means that, in most cases, the CB, PB and TB have the same block size in the quadtree with nested multi-type tree coding block structure. The exception occurs when maximum supported transform length is smaller than the width or height of the colour component of the CB. In some implementations, in addition to the binary or ternary splitting, the nested patterns of FIG. 9 may further include quadtree splitting.

Figure 10:
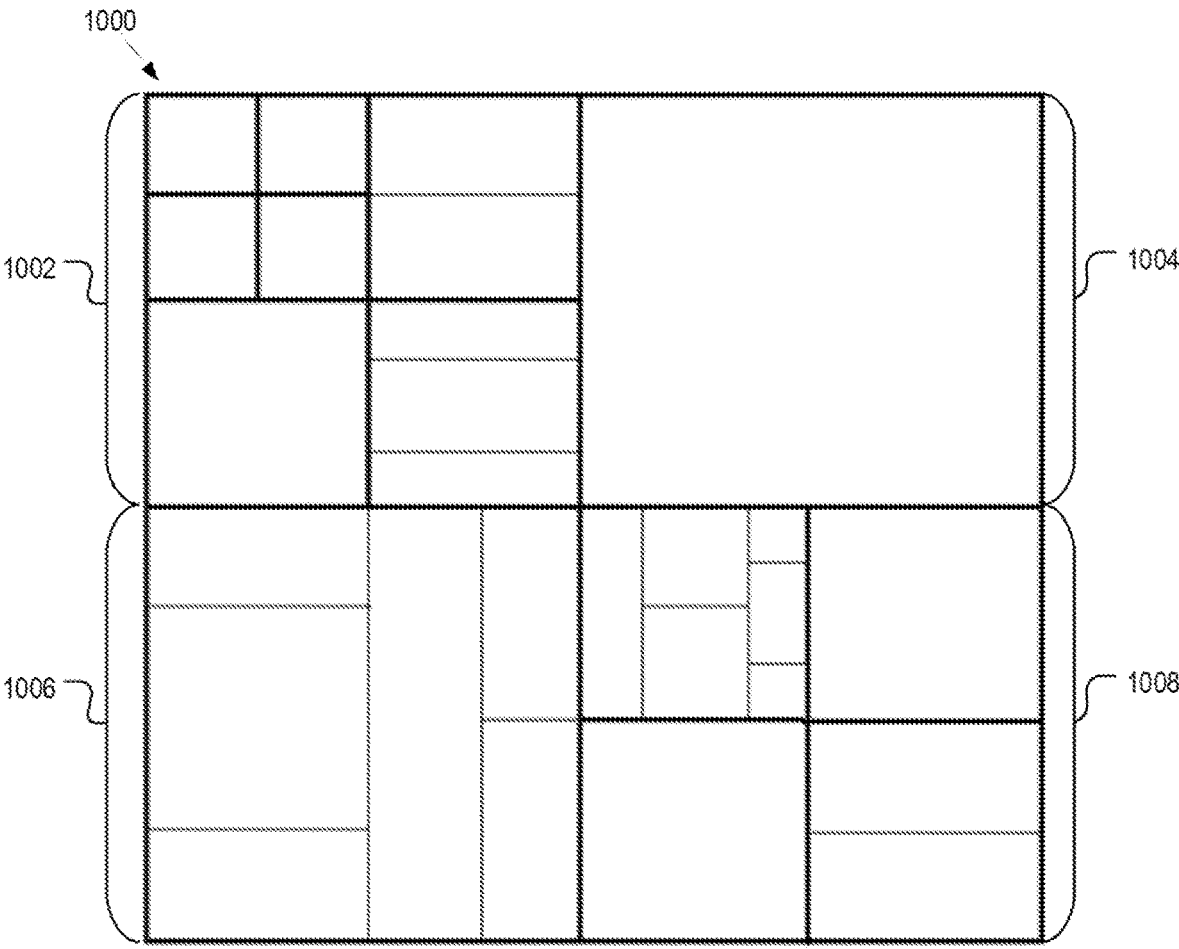
FIG. 10 shows an example partitioning of a base block into coding blocks according to an example partitioning scheme.

One specific example for the quadtree with nested multi-type tree coding block structure of block partition for one base block is shown in FIG. 10. A base block 1000 is quadtree split into four square partitions 1002, 1004, 1006, and 1008. Decision to further use the multi-type tree structure of FIG. 9 and quadtree for further splitting is made for each of the quadtree-split partitions. In the example of FIG. 10, partition 1004 is not further split. Partitions 1002 and 1008 each adopt another quadtree split. For partition 1002, the second level quadtree-split top-left, top-right, bottom-left, and bottom-right partitions adopts third level splitting of quadtree, horizontal binary splitting, non-splitting, and horizontal ternary splitting, respectively. Partition 1208 adopts another quadtree split, and the second level quadtree-split top-left, top-right, bottom-left, and bottom-right partitions adopts third level splitting of vertical ternary splitting, non-splitting, non-splitting, and horizontal binary splitting, respectively. Partition 1006 adopts a second level split pattern following the vertical binary splitting into two partitions which are further split in a third-level according to horizontal ternary splitting and vertical binary splitting. A fourth level splitting is further applied to one of them according to horizontal binary splitting.

For the specific example above, the maximum luma transform size may be 64×64 and the maximum supported chroma transform size could be different from the luma at, e.g., 32×32. Even though the example CBs above in FIG. 10 are generally not further split into smaller PBs and/or TBs, when the width or height of the luma coding block or chroma coding block is larger than the maximum transform width or height, the luma coding block or chroma coding block may be automatically split in the horizontal and/or vertical direction to meet the transform size restriction in that direction.

In the specific example for partitioning of a base block into CBs above, and as descried above, the coding tree scheme may support the ability for the luma and chroma to have a separate block tree structure. For example, for P and B slices, the luma and chroma CTBs in one CTU may share the same coding tree structure. For I slices, for example, the luma and chroma may have separate coding block tree structures. When separate block tree structures are applied, luma CTB may be partitioned into luma CBs by one coding tree structure, and the chroma CTBs are partitioned into chroma CBs by another coding tree structure. This means that a CU in an I slice may consist of a coding block of the luma component or coding blocks of two chroma components, and a CU in a P or B slice always consists of coding blocks of all three color components unless the video is monochrome.

When a coding block is further partitioned into multiple transform blocks, the transform blocks therein may be order in the bitstream following various order or scanning manners. Example implementations for partitioning a coding block or prediction block into transform blocks, and a coding order of the transform blocks are described in further detail below. In some example implementations, as descried above, a transform partitioning may support transform blocks of multiple shapes, e.g., 1:1 (square), 1:2/2:1, and 1:4/4:1, with transform block sizes ranging from, e.g., 4×4 to 64×64. In some implementations, if the coding block is smaller than or equal to 64×64, the transform block partitioning may only apply to luma component, such that for chroma blocks, the transform block size is identical to the coding block size. Otherwise, if the coding block width or height is greater than 64, then both the luma and chroma coding blocks may be implicitly split into multiples of min (W, 64)×min (H, 64) and min (W, 32)×min (H, 32) transform blocks, respectively.

In some example implementations of transform block partitioning, for both intra and inter coded blocks, a coding block may be further partitioned into multiple transform blocks with a partitioning depth up to a predefined number of levels (e.g., 2 levels). The transform block partitioning depth and sizes may be related. For some example implementations, a mapping from the transform size of the current depth to the transform size of the next depth is shown in the following in Table 1.

TABLE 1

| Transform partition size setting | |
|---|---|
| Transform size of current depth | Transform size of next depth |
| TX_4 × 4 | TX_4 × 4 |
| TX_8 × 8 | TX_4 × 4 |
| TX_16 × 16 | TX_8 × 8 |
| TX_32 × 32 | TX_16 × 16 |
| TX_64 × 64 | TX_32 × 32 |
| TX_4 × 8 | TX_4 × 4 |
| TX_8 × 4 | TX_4 × 4 |
| TX_8 × 16 | TX_8 × 8 |
| TX_16 × 8 | TX_8 × 8 |
| TX_16 × 32 | TX_16 × 16 |
| TX_32 × 16 | TX_16 × 16 |
| TX_32 × 64 | TX_32 × 32 |
| TX_64 × 32 | TX_32 × 32 |
| TX_4 × 16 | TX_4 × 8 |
| TX_16 × 4 | TX_8 × 4 |
| TX_8 × 32 | TX_8 × 16 |
| TX_32 × 8 | TX_16 × 8 |
| TX_16 × 64 | TX_16 × 32 |
| TX_64 × 16 | TX_32 × 16 |

Based on the example mapping of Table 1, for 1:1 square block, the next level transform split may create four 1:1 square sub-transform blocks. Transform partition may stop, for example, at 4×4. As such, a transform size for a current depth of 4×4 corresponds to the same size of 4×4 for the next depth. In the example of Table 1, for 1:2/2:1 non-square block, the next level transform split may create two 1:1 square sub-transform blocks, whereas for 1:4/4:1 non-square block, the next level transform split may create two 1:2/2:1 sub transform blocks.

Figures 11, 12:
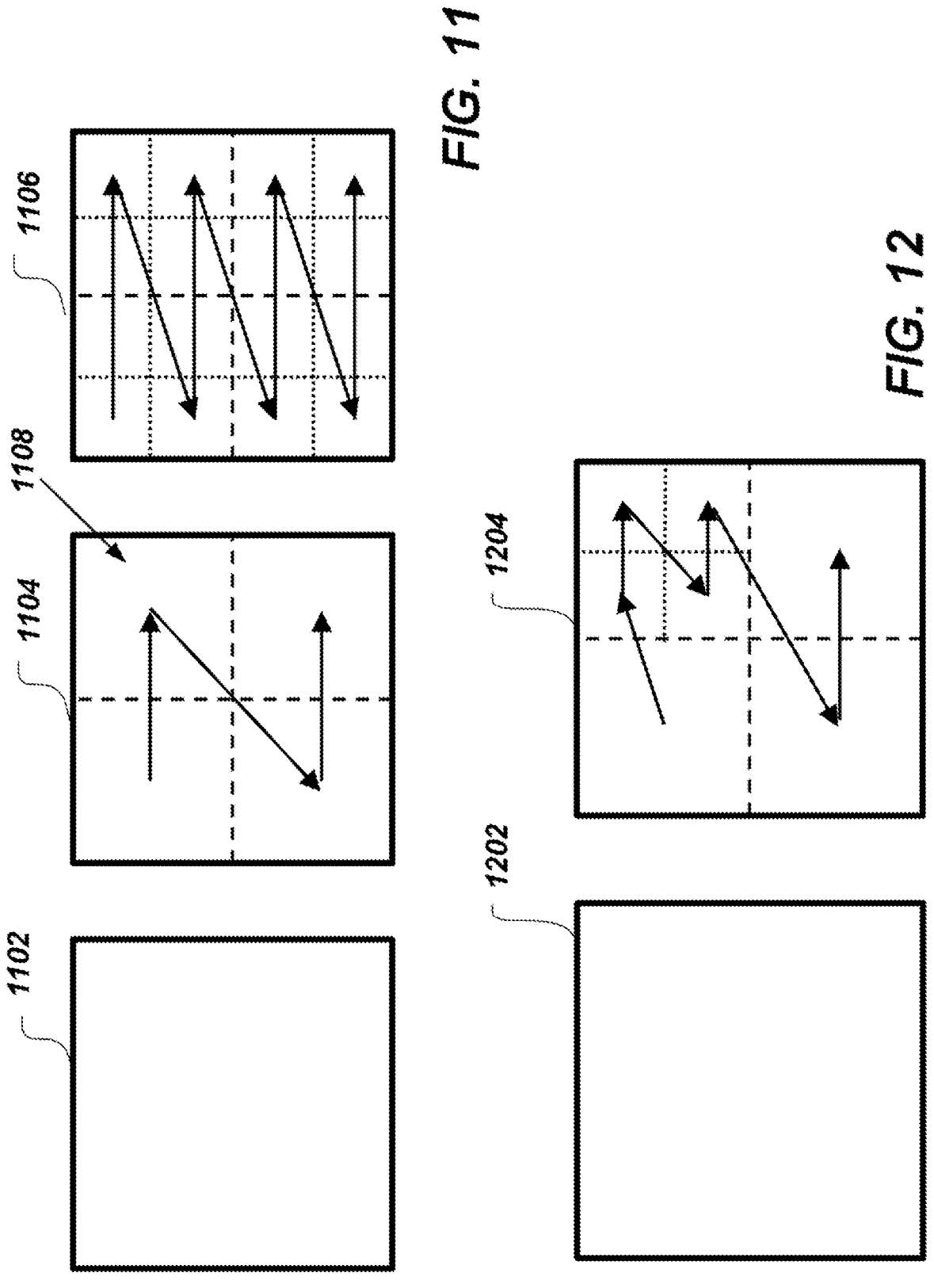
FIG. 11 shows a scheme for partitioning a coding block into multiple transform blocks and coding order of the transform blocks according to example embodiments of the disclosure.
FIG. 12 shows another scheme for partitioning a coding block into multiple transform blocks and coding order of the transform block according to example embodiments of the disclosure.

In some example implementations, for luma component of an intra coded block, additional restriction may be applied with respect to transform block partitioning. For example, for each level of transform partitioning, all the sub-transform blocks may be restricted to having equal size. For example, for a 32×16 coding block, level 1 transform split creates two 16×16 sub-transform blocks, level 2 transform split creates eight 8×8 sub-transform blocks. In other words, the second level splitting must be applied to all first level sub blocks to keep the transform units at equal sizes. An example of the transform block partitioning for intra coded square block following Table 1 is shown in FIG. 11, together with coding order illustrated by the arrows. Specifically, 1102 shows the square coding block. A first-level split into 4 equal sized transform blocks according to Table 1 is shown in 1104 with coding order indicated by the arrows. A second-level split of all of the first-level equal sized blocks into 16 equal sized transform blocks according to Table 1 is shown in 1106 with coding order indicated by the arrows.

In some example implementations, for luma component of inter coded block, the above restriction for intra coding may not be applied. For example, after the first level of transform splitting, any one of sub-transform block may be further split independently with one more level. The resulting transform blocks thus may or may not be of the same size. An example split of an inter coded block into transform locks with their coding order is show in FIG. 12. In the Example of FIG. 12, the inter coded block 1202 is split into transform blocks at two levels according to Table 1. At the first level, the inter coded block is split into four transform blocks of equal size. Then only one of the four transform blocks (not all of them) is further split into four sub-transform blocks, resulting in a total of 7 transform blocks having two different sizes, as shown by 1204. The example coding order of these 7 transform blocks is shown by the arrows in 1204 of FIG. 12.

In some example implementations, for chroma component(s), some additional restriction for transform blocks may apply. For example, for chroma component(s) the transform block size can be as large as the coding block size, but not smaller than a predefined size, e.g., 8×8.

In some other example implementations, for the coding block with either width (W) or height (H) being greater than 64, both the luma and chroma coding blocks may be implicitly split into multiples of min (W, 64)×min (H, 64) and min (W, 32)×min (H, 32) transform units, respectively. Here, in the present disclosure, a "min (a, b)" may return a smaller value between a and b.

Zero Transform Coefficient Flag Coding

In video coding technologies such as AV1, for each intra and inter coding block, a flag, namely skip_txfm flag, is signaled, as shown in the following tables indicated by the read_skip( ) function. This flag is indicating whether the transform coefficients are all zero in the current coding block. If this flag is signaled with a value 1, then transform coefficients related syntaxes, e.g., EOB, is not signalled and derived as a value associated for zero transform coefficients block. For inter coding block, this flag is signalled after skip mode flag, when skip_mode is true, skip_txfm flag is not signalled and inferred as 1, otherwise, skip_txfm flag is signaled. Table 2 below shows example intra frame mode info syntax.

TABLE 2

| Intra frame mode info syntax | |
| --- | --- |
| | Type |
| intra_frame_mode_info( ) { | |
|   skip = 0 | |
|   if ( SegIdPreSkip ) | |
|     intra_segment_id( ) | |
|   skip_mode = 0 | |
|   read_skip( ) | |
|   if ( !SegIdPreSkip ) | |
|     intra_segment_id( ) | |
|   read_cdef( ) | |
|   read_delta_qindex( ) | |
|   read_delta_lf( ) | |
|   ReadDeltas = 0 | |
|   RefFrame[ 0 ] = INTRA_FRAME | |
|   RefFrame[ 1 ] = NONE | |
|   if ( allow_intrabc ) { | |

TABLE 2-continued

| Intra frame mode info syntax | |
| --- | --- |
| | Type |
|     use_intrabc | S( ) |
|   } else { | |
|     use_intrabc = 0 | |
|   } | |

Table 3 below shows example inter frame mode info syntax.

TABLE 3

| Inter frame mode info syntax | |
| --- | --- |
| | Type |
| inter_frame_mode_info( ) { | |
|   use_intrabc = 0 | |
|   LeftRefFrame[ 0 ] = AvailL ? | |
| RefFrames[ MiRow ][ MiCol–1 ][ 0 ] : INTRA_FRAME | |
|   AboveRefFrame[ 0 ] = AvailU ? RefFrames[ MiRow– | |
| 1 ][ MiCol ][ 0 ] : INTRA_FRAME | |
|   LeftRefFrame[ 1 ] = AvailL ? | |
| RefFrames[ MiRow ][ MiCol–1 ][ 1 ] : NONE | |
|   AboveRefFrame[ 1 ] = AvailU ? RefFrames[ MiRow– | |
| 1 ][ MiCol ][ 1 ] : NONE | |
|   LeftIntra = LeftRefFrame[ 0 ] <= INTRA_FRAME | |
|   AboveIntra = AboveRefFrame[ 0 ] <= INTRA_FRAME | |
|   LeftSingle = LeftRefFrame[ 1 ] <= INTRA_FRAME | |
|   AboveSingle = AboveRefFrame[ 1 ] <= INTRA_FRAME | |
|   skip = 0 | |
|   inter_segment_id( 1 ) | |
|   read_skip_mode( ) | |
|   if ( skip_mode ) | |
|     skip = 1 | |
|   else | |
|     read_skip( ) | |

Table 4 below shows example skip syntax.

TABLE 4

| Skip syntax | |
| --- | --- |
| | Type |
| read_skip( ) { | |
|   if ( SegIdPreSkip && seg_feature_active( SEG_LVL_SKIP ) | |
|   ) { | |
|     skip = 1 | |
|   } else { | |
|     skip | S( ) |
|   } | |
| } | |

Skip Flag Semantics

In some example implementations, for a block such as a transform block, a skip flag may be used to indicate whether there may be transform coefficient(s) to read for this block. When the skip flag is equal to 0, it indicates that there are transform coefficient(s) to read (or the block has at least one non zero transform coefficient). Whereas when the skip flag is equal to 1, it indicates that there are no transform coefficients to read (or the block has all non zero transform coefficient).

In some example implementations, a context may be derived for entropy encoding/decoding the above skip flag. For example, the derivation of the context may depend on the skip flag values of the above and/or left neighboring blocks. Exemplarily, there may be a total one 3 candidate contexts, and they may be stored in an array. If none of above or left neighboring blocks is coded with nonzero skip flag, context value 0 (i.e., array index 0) is used. If one of above and left neighboring blocks is coded with nonzero skip flag, context value 1 (i.e., array index 1) is used. If both above and left neighboring blocks are coded with nonzero skip flag, context value 2 (i.e., array index 2) is used.

In some example implementations, the aforementioned context array may include, for example, TileSkipCdf[ctx]. Here ctx is the index which may be computed by a function as illustrated in Table 5 below.

TABLE 5

| ctx derivation |
| --- |
| ctx = 0 |
| if ( AvailU ) |
|    ctx += Skips[ MiRow − 1 ][ MiCol ] |
| if ( AvailL ) |
|    ctx += Skips[ MiRow ][ MiCol − 1 ] |

In current video coding technologies, such as AV1, it is when the current block is coded as an intra block, the residual block can rarely be zero, however, a flag indicating whether the residual block is all zero or not is still signaled, which is additional overhead without benefit on coding gains.

In this disclosure, various embodiments are disclosed for improving video encoding/decoding technologies, including AV1, HEVC, VVC, VP9, and the like. These embodiments aim to improve entropy coding efficiency, optimizing entropy coding context, and reducing signaling overhead.

Based on investigation and statistical observation on video coding technologies such as AV1, it is discovered that values of residual block are strongly correlated with prediction mode associated with the residual block. One observation shows that when a current block (i.e., the block currently being encoding/decoding) is coded as an intra block, the residual block can rarely be zero. That is, the probability for residuals in a residual block to be all zero is very low (close to or equal to 0). The same observation may also apply to transform coefficients and quantized transform coefficients in transform block(s) in the current block. Refer to FIG. 11 for an example. With no further partitioning, current block 1102 may be the transform block. With 1 level partitioning, the current block 1104 may be split into 4 transform blocks. With 2 level partitioning, the current block 1106 may be split into 16 transform blocks. Therefore, based on the statistical observation, if the current block is coded as an intra block (i.e., intra prediction is applied to current block 1102, 1104, and 1106), then for any transform blocks shown in FIG. 11, the probability for the transform block having all zero transform coefficients (or quantized transform coefficients) is very low.

However, under current video coding technologies, a flag indicating whether the residual block (or transform block, quantized transform block) is all zero or not is still signaled, which adds additional overhead without benefit on coding gains. In this disclosure, when a block (e.g., a residual block, a transform block, or a quantized transform block) is all zero, it means the parameters (residuals, coefficients, or quantized coefficients) in the block are all zero.

In this disclosure, various embodiments are disclosed for improving video encoding/decoding technologies, including AV1, HEVC, VVC, VP9, and the like. These embodiments aim for at least improving entropy coding efficiency, optimizing entropy coding context, and reducing signaling overhead. These embodiments may be implemented in a decoder, and/or an encoder.

In this disclosure, if a prediction mode is not smooth mode, or the prediction mode is generating prediction samples according to a given prediction direction, this mode is called angular mode or directional mode. An angular mode may be also referred to as a directional mode.

In this disclosure, the term block may refer to a transform block, a coded block, a prediction block, a coding block, a coding unit (CU), etc. In this disclosure, when saying block size, it may refer to either the block width or height, or maximum value of width and height, or minimum of width and height, or area size (width*height), or aspect ratio (width:height, or height:width) of the block. The term chroma block may refer to a block in any of the chrominance (color) channels. The direction of a reference frame is determined by whether the reference frame is prior to current frame in display order or after current frame in display order.

In this disclosure, a sample may be interpreted as pixel value of a pixel. It may generally refer to any component (luma, or chroma).

In this disclosure, unless otherwise specified, a signaling may include one or more sub-signalings. The one or more sub-signalings may be transmitted together, or separately.

In this disclosure, a flag, namely skip_txfm_flag, is used to indicate whether there are some transform coefficients to read for a transform block. When skip_txfm_flag equal to 1, it indicates that there are no transform coefficients need to be read for the transform block. That is, the read operation may be skipped and all transform coefficients in the transform block are considered to be zero. The correlation of prediction mode and skip_txfm_flag is exploited, in order to achieve optimized signaling efficiency and improve coding gain. As a coded block may be partitioned into one or more transform blocks depending on the partitioning scheme, there may be different implementations for skip_txfm_flag. In one example, skip_txfm_flag may be used at transform block level such that each transform block has a dedicated skip_txfm_flag. In another example, skip_txfm_flag may be used at coding block level such that a single skip_txfm_flag applies to all transform blocks in the current block.

In this disclosure, an "is_inter" flag is used to indicate whether a block is predicted under inter prediction mode; and an "is_intrabc" is used to indicate whether a block is predicted under IntraBC mode.

In this disclosure, information such as a flag may be explicitly signaled in the video bitstream via, for example, syntax element. When a flag is explicitly signaled, the decode extract the flag directly from the bitstream. A flag may also be implicitly derived by the decoder, from other information. In this case the flag is not carried in the bitstream.

In one embodiment, the intra block copy (IntraBC) mode may be allowable and used/signaled in the current block. The term "allowable" means that IntraBC mode is an allowed option for the current block, such that the IntraBC mode is allowed to be enabled or applied to the current block (i.e., the current block is coded under IntraBC mode). Conversely, when IntraBC mode is not allowed, or prohibited, it means IntraBC mode is not an option (i.e., the current block cannot be coded under IntraBC mode). Note that "allowed" doesn't necessarily mean that the current has to use IntraBC mode, but rather mean IntraBC mode is an option and subject to further enablement.

In some example implementations, when IntraBC mode is allowable for the current block, if skip_txfm_flag is equal to 1 and is_inter is parsed as false (or 0), then is_intrabc flag is not parsed but derived as true (or 1). That is, in this case, is_intrabc flag does not need to be encoded and signaled in the video bitstream, no syntax element is used to explicitly carry the is_intrabc flag. The decoder will derive this flag.

In some example implementations, when IntraBC mode is not allowed (i.e., cannot be used/signaled) in the current block, and skip_txfm_flag is equal to 1, then is_inter flag is not signaled/parsed but derived as true. That is, when a transform block is all zero but the current block is not intraBC coded, then the current block has to be inter predicted and no explicit signaling is required for is_inter flag.

In one embodiment, when IntraBC mode is allowed in the current block and skip_txfm_flag is equal to 1, one flag is signaled to indicate whether the current block is inter coded. If the flag indicates that current block is not inter coded block, then the current block is inferred as an intra block copy block. That is, if the current block is not inter coded and there is at least one transform block (in the current block) that is all zero, then the current block has to be coded in IntraBC mode.

In one embodiment, when IntraBC mode is allowed in the current block and skip_txfm_flag is equal to 1, one flag is signaled to indicate whether the current block is an IntraBC block. If the flag indicates that the current block is not IntraBC predicted, then it is inferred as an inter block. That is, if the current block is not IntraBC block and there is at least one transform block (in the current block) that is all zero, then the current block has to be coded in inter prediction mode.

In one embodiment, when the current picture is one of: a key (intra) picture; an intra slice; an intra-only tile; or an intra only subpicture, and if IntraBC mode is not allowed (i.e., cannot be used/signaled) in the current block, then the skip_txfm_flag is not signaled but derived as 0, indicating that the corresponding transform block(s) in the current block may have a nonzero coefficient. Note that as described earlier, the skip_txfm_flag may apply to one transform block, or all transform blocks in the current block.

In one embodiment, there are more than one transform blocks in the current block, for example, as shown in FIGS. 11 and 12, blocks 1104, 1106, and 1204. The value of skip_txfm_flag may be exploited to adjust or optimize the coding order the transform blocks. For example, when skip_txfm_flag is equal to 0, the coding order of the transform blocks may be adjusted based on the number of transform blocks, and/or block size of the current block. Exemplarily, an initial coding order is illustrated by arrows in block 1106 of FIG. 11. The initial coding order may be further adjusted when skip_txfm_flag is equal to 0. For example, the coding order may be reversed. For another example, the coding order may be ordered by number of non zero coefficients in each transform block—the transform block with more non zero coefficients has higher priority in coding order (coded first).

When skip_txfm_flag is equal to 0 and multiple transform blocks are coded using the transform partitioning scheme as described with reference to FIG. 7 (i.e., PARTITION_NONE, PARTITION_VERT, PARTITION_HORZ, PARTITION_SPLIT), if, following the coding order, all the preceding transform blocks are associated with zero residual except the last one, then the transform block level flag indicating whether the last transform block has all zero residual or not (EOB equals to 0) is not signaled, but inferred accordingly such that the flag indicating that the last transform block does not have all zero residual.

In one embodiment, the probability distribution of whether a transform block is all non zero is observed to be correlated with the prediction mode of the current block. Therefore, when entropy encoding the skip_txfm_flag, a prediction mode of the current block may be taken into consideration when selecting the entropy encoding context. Specifically, when the current block is coded by Palette mode, the entropy encoding context is different compared with a block that is not coded by Palette mode. In example implementations, the context value depends on whether the current block is coded by Palette mode. For example, a context value 1 may be chosen if the current block is coded by Palette mode, and other context value may be chosen if the current block is not coded by Palette mode.

In one embodiment, the probability distribution of whether a transform block is all non zero is observed to be correlated with the block size of the current block. Therefore, the context derivation is depending on the block sizes. For example, when block size is greater than a threshold N, context 0 is used. When block size is smaller or equal to N, another context, such as context 1 is used. The threshold N may be preconfigured, or may be signaled in the video bitstream.

In this disclosure, the embodiments are described for exemplary purpose. Various embodiments and/or implementations described in the present disclosure may be performed separately or combined in any order. The described features, advantages and characteristics of the present solution may be combined in any suitable manner in one or more embodiments. One of ordinary skill in the relevant art will recognize, in light of the description herein, that the present solution may be practiced without one or more of the specific features or advantages of a particular embodiment. In other instances, additional features and advantages may be recognized in certain embodiments that may not be present in all embodiments of the present solution. Further, each of the methods (or embodiments), encoder, and decoder may be implemented by processing circuitry (e.g., one or more processors or one or more integrated circuits). The one or more processors execute a program that is stored in a non-transitory computer-readable medium. In the present disclosure, the term block may be interpreted as a prediction block, a coding block, or a coding unit (CU).

FIG. 13 shows a flow chart 1300 of an exemplary method for decoding a video bitstream following the principles described in above embodiments. The exemplary method flow may include a portion or all of the following steps: S1310, receiving a video bitstream comprising a current picture, the current picture comprising a current block, and the current block comprising a current transform block; S1320, determining a skip transform flag indicating whether the current transform block has all zero coefficient or not via one of: receiving the skip transform flag from the video bitstream; or deriving the skip transform flag; S1330, deriving, based on the skip transform flag, at least one of following flags: an IntraBC (Intra Block Copy) flag indicating whether Intra Block Copy is applied to the current block; an interPrediction flag indicating whether the current block is coded in inter-prediction mode; and S1340, reconstructing the current block based on at least one of: the IntraBC flag, the interPrediction flag.

In the present disclosure, a direction of a reference frame may be determined by whether the reference frame is prior to current frame in display order or after current frame in display order.

Operations above may be combined or arranged in any amount or order, as desired. Two or more of the steps and/or operations may be performed in parallel. Embodiments and implementations in the disclosure may be used separately or combined in any order. Steps in one embodiment/method may be split to form multiple sub-methods, each of the sub-methods may be independent of other steps in the embodiment and may form a standalone solution. Further, each of the methods (or embodiments), an encoder, and a decoder may be implemented by processing circuitry (e.g., one or more processors or one or more integrated circuits). In one example, the one or more processors execute a program that is stored in a non-transitory computer-readable medium. Embodiments in the disclosure may be applied to a luma block or a chroma block. The term block may be interpreted as a prediction block, a coding block, or a coding unit, i.e. CU. The term block here may also be used to refer to the transform block.

The techniques described above, can be implemented as computer software using computer-readable instructions and physically stored in one or more computer-readable media. For example, FIG. 14 shows a computer system (1800) suitable for implementing certain embodiments of the disclosed subject matter.

The computer software can be coded using any suitable machine code or computer language, that may be subject to assembly, compilation, linking, or like mechanisms to create code comprising instructions that can be executed directly, or through interpretation, micro-code execution, and the like, by one or more computer central processing units (CPUs), Graphics Processing Units (GPUs), and the like.

The instructions can be executed on various types of computers or components thereof, including, for example, personal computers, tablet computers, servers, smartphones, gaming devices, internet of things devices, and the like.

Figure 14:
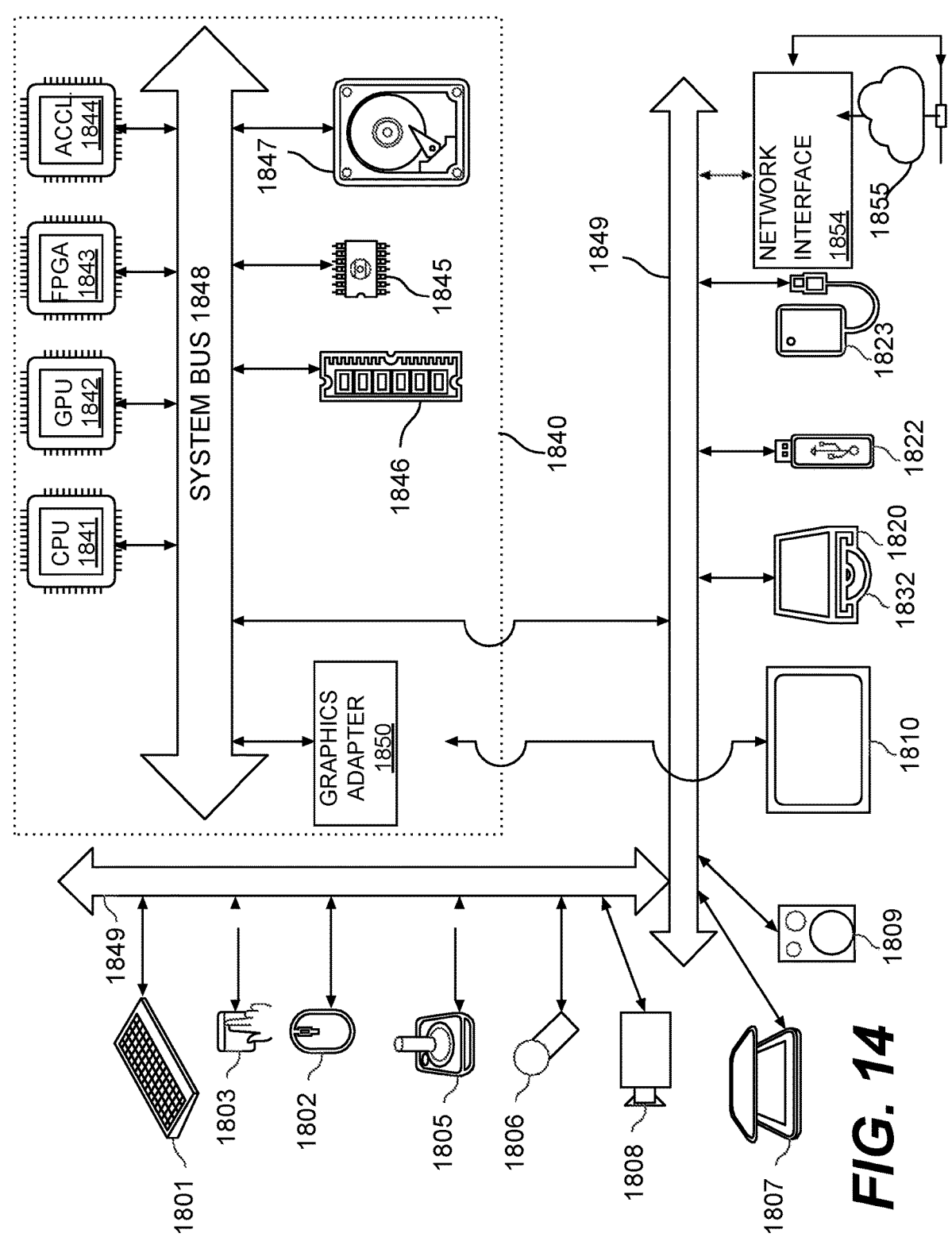
FIG. 14 shows a schematic illustration of a computer system in accordance with example embodiments of this disclosure.

The components shown in FIG. 14 for computer system (1800) are exemplary in nature and are not intended to suggest any limitation as to the scope of use or functionality of the computer software implementing embodiments of the present disclosure. Neither should the configuration of components be interpreted as having any dependency or requirement relating to any one or combination of components illustrated in the exemplary embodiment of a computer system (1800).

Computer system (1800) may include certain human interface input devices. Input human interface devices may include one or more of (only one of each depicted): keyboard (1801), mouse (1802), trackpad (1803), touch screen (1810), data-glove (not shown), joystick (1805), microphone (1806), scanner (1807), camera (1808).

Computer system (1800) may also include certain human interface output devices. Such human interface output devices may be stimulating the senses of one or more human users through, for example, tactile output, sound, light, and smell/taste. Such human interface output devices may include tactile output devices (for example tactile feedback by the touch-screen (1810), data-glove (not shown), or joystick (1805), but there can also be tactile feedback devices that do not serve as input devices), audio output devices (such as: speakers (1809), headphones (not depicted)), visual output devices (such as screens (1810) to include CRT screens, LCD screens, plasma screens, OLED screens, each with or without touch-screen input capability, each with or without tactile feedback capability-some of which may be capable to output two dimensional visual output or more than three dimensional output through means such as stereographic output; virtual-reality glasses (not depicted), holographic displays and smoke tanks (not depicted)), and printers (not depicted).

Computer system (1800) can also include human accessible storage devices and their associated media such as optical media including CD/DVD ROM/RW (1820) with CD/DVD or the like media (1821), thumb-drive (1822), removable hard drive or solid state drive (1823), legacy magnetic media such as tape and floppy disc (not depicted), specialized ROM/ASIC/PLD based devices such as security dongles (not depicted), and the like.

Those skilled in the art should also understand that term "computer readable media" as used in connection with the presently disclosed subject matter does not encompass transmission media, carrier waves, or other transitory signals.

Computer system (1800) can also include an interface (1854) to one or more communication networks (1855). Networks can for example be wireless, wireline, optical. Networks can further be local, wide-area, metropolitan, vehicular and industrial, real-time, delay-tolerant, and so on. Examples of networks include local area networks such as Ethernet, wireless LANs, cellular networks to include GSM, 3G, 4G, 5G, LTE and the like, TV wireline or wireless wide area digital networks to include cable TV, satellite TV, and terrestrial broadcast TV, vehicular and industrial to include CAN bus, and so forth.

Aforementioned human interface devices, human-accessible storage devices, and network interfaces can be attached to a core (1840) of the computer system (1800).

The core (1840) can include one or more Central Processing Units (CPU) (1841), Graphics Processing Units (GPU) (1842), specialized programmable processing units in the form of Field Programmable Gate Areas (FPGA) (1843), hardware accelerators for certain tasks (1844), graphics adapters (1850), and so forth. These devices, along with Read-only memory (ROM) (1845), Random-access memory (1846), internal mass storage such as internal non-user accessible hard drives, SSDs, and the like (1847), may be connected through a system bus (1848). In some computer systems, the system bus (1848) can be accessible in the form of one or more physical plugs to enable extensions by additional CPUs, GPU, and the like. The peripheral devices can be attached either directly to the core's system bus (1848), or through a peripheral bus (1849). In an example, the screen (1810) can be connected to the graphics adapter (1850). Architectures for a peripheral bus include PCI, USB, and the like.

The computer readable media can have computer code thereon for performing various computer-implemented operations. The media and computer code can be those specially designed and constructed for the purposes of the present disclosure, or they can be of the kind well known and available to those having skill in the computer software arts.

While this disclosure has described several exemplary embodiments, there are alterations, permutations, and various substitute equivalents, which fall within the scope of the disclosure. It will thus be appreciated that those skilled in the art will be able to devise numerous systems and methods which, although not explicitly shown or described herein, embody the principles of the disclosure and are thus within the spirit and scope thereof.

What is claimed is:

1. A method for decoding a video bitstream, performed by a decoder, the method comprising:

receiving the video bitstream comprising a current transform block in a current block of a current picture;

determining a skip transform flag based on the received video bitstream;

deriving, based on the skip transform flag, at least one of following flags:

an intra block copy flag indicating whether an Intra Block Copy mode is applied to the current block, without parsing a syntax element dedicated to explicitly indicating the Intra Block Copy mode; or an inter prediction flag indicating whether the current block is coded in inter prediction mode, without parsing a syntax element dedicated to explicitly indicating the inter prediction mode; and reconstructing the current block based on at least one of the intra block copy flag and the inter prediction flag derived from the skip transform flag.

2. The method of claim 1, wherein intra block copy is allowed for the current block, and deriving the at least one of following flags comprises:

in response to the skip transform flag being true and the inter prediction flag being false, deriving the intra block copy flag to be true.

3. The method of claim 1, wherein intra block copy is not allowed for the current block, and deriving the at least one of following flags comprises:

in response to the skip transform flag being true, deriving the inter prediction flag to be true.

4. The method of claim 1, wherein:

intra block copy is allowed for the current block;

the method further comprises:

receiving, from the video bitstream, the inter prediction flag; and deriving the at least one of following flags comprises:

in response to the inter prediction flag being false, deriving the intra block copy flag to be true.

5. The method of claim 1, wherein:

intra block copy is allowed for the current block;

the skip transform flag being true;

the method further comprises:

receiving, from the video bitstream, the intra block copy flag; and deriving the at least one of following flags comprises:

in response to the intra block copy flag being false, deriving the inter prediction flag to be true.

6. The method of claim 1, wherein a selection of a context for entropy decoding the skip transform flag depends on whether the current block is coded by a palette mode, the selection is different when the current block is coded by the palette mode compared with when the current block is not coded by the palette mode.

7. The method of claim 1, wherein a selection of a context for entropy decoding the skip transform flag depends on a size of the current block.

8. The method of claim 1, further comprising:

in response to a size of the current block be great than a predetermined threshold, selecting a first context to be used to entropy decoding the skip transform flag; and in response to a size of the current block be equal to or less than the predetermined threshold, selecting a second context to be used to entropy decoding the skip transform flag.

9. The method of claim 1, wherein the current block comprises a plurality of transform blocks, the method further comprising:

in response to the skip transform flag being false, adjusting a decoding order of the plurality of transform blocks based on a size of the current block and a quantity of the plurality of transform blocks.

10. The method of claim 9, wherein adjusting the decoding order comprises reversing a decoding order used when the skip transform flag being true.

11. The method of claim 1, wherein:

the current block comprises a plurality of transform blocks;

following a coding order, the plurality of transform blocks comprise a last transform block, and N transform blocks preceding the last transform block, the method further comprising:

in response to: 1) the skip transform flag being false; and 2) all the N transform blocks having been determined to having all zero coefficients, determining that the last transform block has at least one non-zero coefficient, or determining that a flag indicating whether the last transform block having all non-zero coefficients is false.

12. A device for decoding a video bitstream, the device comprising a memory for storing computer instructions and a processor in communication with the memory, wherein, when the processor executes the computer instructions, the processor is configured to cause the device to:

receive the video bitstream comprising a current picture, the current picture comprising a current block, and the current block comprising a current transform block;

determine a skip transform flag indicating whether the current transform block has all zero coefficient or not via one of:

receiving the skip transform flag from the video bitstream; or deriving the skip transform flag;

derive, based on the skip transform flag, at least one of following flags:

an intra block copy flag indicating whether an Intra Block Copy mode is applied to the current block, without parsing a syntax element dedicated to explicitly indicating the Intra Block Copy mode; or an inter prediction flag indicating whether the current block is coded in inter-prediction mode, without parsing a syntax element dedicated to explicitly indicating the inter prediction mode; and reconstruct the current block based on at least one of: the intra block copy flag, the inter prediction flag.

13. The device of claim 12, wherein intra block copy is allowed for the current block, and wherein, when the processor is configured to cause the device to derive the at least one of following flags, the processor is configured to cause the device to:

in response to the skip transform flag being true and the inter prediction flag being false, derive the intra block copy flag to be true.

14. The device of claim 12, wherein intra block copy is not allowed for the current block, and wherein, when the processor is configured to cause the device to derive the at least one of following flags, the processor is configured to cause the device to:

in response to the skip transform flag being true, derive the inter prediction flag to be true.

15. The device of claim 12, wherein:

intra block copy is allowed for the current block;

when the processor executes the computer instructions, the processor is configured to further cause the device to:

receiving, from the video bitstream, the inter prediction flag; and wherein, when the processor is configured to cause the device to derive the at least one of following flags, the processor is configured to cause the device to:

in response to the inter prediction flag being false, derive the intra block copy flag to be true.

16. The device of claim 12, wherein:

intra block copy is allowed for the current block;

the skip transform flag being true;

when the processor executes the computer instructions, the processor is configured to further cause the device to:

receive, from the video bitstream, the intra block copy flag; and when the processor is configured to cause the device to derive the at least one of following flags, the processor is configured to cause the device to:

in response to the intra block copy flag being false, derive the inter prediction flag to be true.

17. The device of claim 12, wherein a selection of a context for entropy decoding the skip transform flag depends on whether the current block is coded by a palette mode, the selection is different when the current block is coded by the palette mode compared with when the current block is not coded by the palette mode.

18. The device of claim 12, wherein a selection of a context for entropy decoding the skip transform flag depends on a size of the current block.

19. The device of claim 12, wherein, when the processor executes the computer instructions, the processor is configured to further cause the device to:

in response to a size of the current block be great than a predetermined threshold, select a first context to be used to entropy decoding the skip transform flag; and in response to a size of the current block be equal to or less than the predetermined threshold, select a second context to be used to entropy decoding the skip transform flag.

20. A non-transitory storage medium for storing computer readable instructions, the computer readable instructions, when executed by a processor in a decoder for decoding a video bitstream, causing the processor to:

receive the video bitstream comprising a current picture, the current picture comprising a current block, and the current block comprising a current transform block;

determine a skip transform flag indicating whether the current transform block has all zero coefficient or not via one of:

receiving the skip transform flag from the video bitstream; or deriving the skip transform flag;

derive, based on the skip transform flag, at least one of following flags:

an intra block copy flag indicating whether an Intra Block Copy mode is applied to the current block, without parsing a syntax element dedicated to explicitly indicating the Intra Block Copy mode; or an inter prediction flag indicating whether the current block is coded in inter-prediction mode, without parsing a syntax element dedicated to explicitly indicating the inter prediction mode; and reconstruct the current block based on at least one of: the intra block copy flag, the inter prediction flag.

* * * * *